United States Patent [19]
Tokumitsu et al.

[11] Patent Number: 5,513,166
[45] Date of Patent: Apr. 30, 1996

[54] OPTICAL RECORDING AND REPRODUCING APPARATUS FOR CONTROLLING A LASER DRIVER CURRENT ACCORDING TO TEST DATA ON THE DISC

[75] Inventors: Kenji Tokumitsu; Fumihiro Harigai, both of Odawara, Japan

[73] Assignee: Hitachi, Ltd., Tokyo, Japan

[21] Appl. No.: 229,317

[22] Filed: Apr. 18, 1994

[30]     Foreign Application Priority Data

Apr. 22, 1993   [JP]   Japan .................................. 5-096119

[51] Int. Cl.⁶ ..................................................... G11B 7/00
[52] U.S. Cl. ............................................. 369/116; 369/54
[58] Field of Search ............................. 369/116, 54, 58, 369/48, 47, 32, 121

[56]               References Cited

U.S. PATENT DOCUMENTS 5,341,360   8/1994   Johann et al. ......................... 369/116

FOREIGN PATENT DOCUMENTS 4-67436   3/1992   Japan .

*Primary Examiner*—Nabil Z. Hindi
*Attorney, Agent, or Firm*—Fay, Sharpe, Beall, Fagan, Minnich & McKee

[57]                ABSTRACT

In an optical information recording method and apparatus for performing the pre-write testing of test data for an optical recording medium connected to a host computer, an instruction for pre-write testing of test data inclusive of two predetermined continuous signals is received independently from a write command from the host computer. The pre-write testing of the test data is performed by supplying different laser driving currents for plural ones of pre-write testing areas of the optical recording medium to an optical information recording head in accordance with the pre-write testing instruction. The respective pre-write testing data are reproduced to determine a difference in an average voltage level between the two continuous signals of each test data. The laser driving current supplied for the pre-write testing of the test data indicative of the smallest value of the difference is set as a laser driving current which is to be supplied to the optical information recording head when the recording of user data is to be performed. A time interval until the next pre-write testing of test data is set in accordance with the set laser driving current. With the above construction, the pre-write testing can be eliminated at every write command requested from the host computer.

20 Claims, 6 Drawing Sheets

FIG. IB
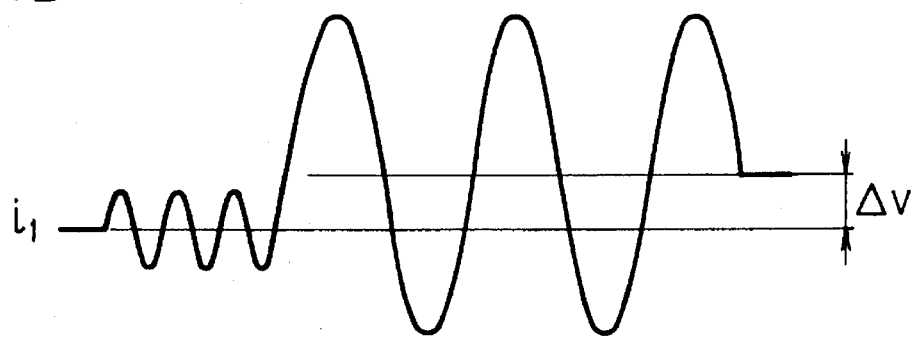
FIG. IC
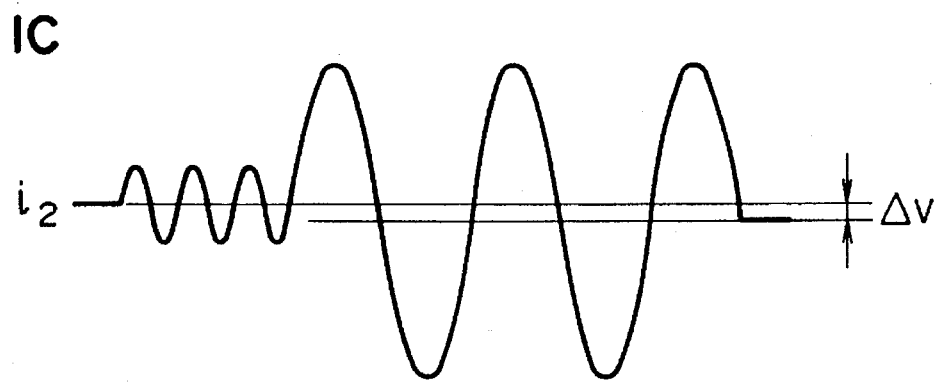
FIG. ID
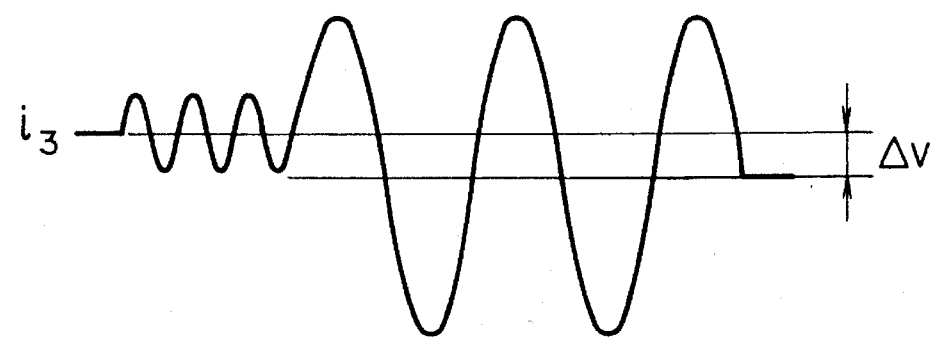

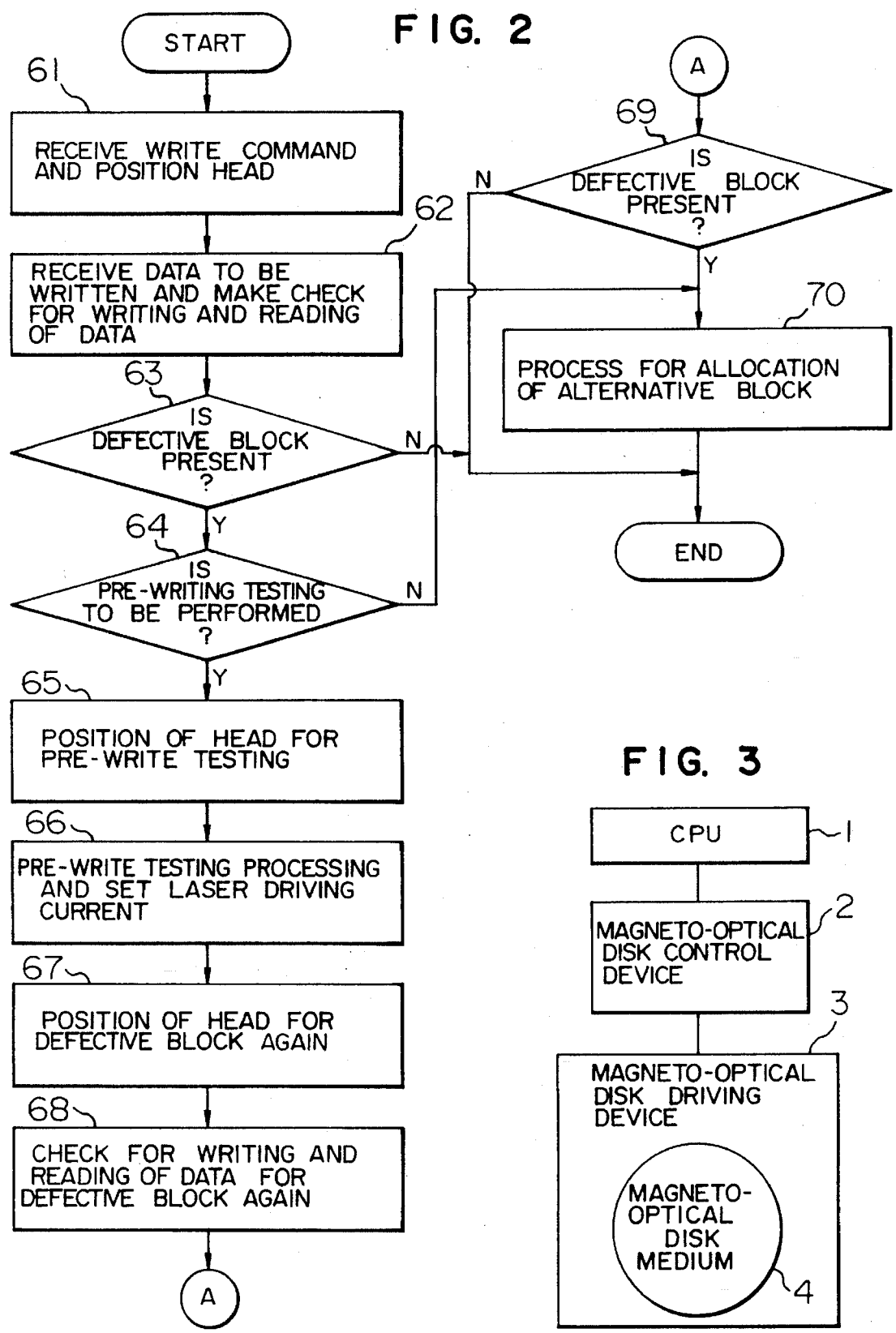

OPTICAL RECORDING AND REPRODUCING APPARATUS FOR CONTROLLING A LASER DRIVER CURRENT ACCORDING TO TEST DATA ON THE DISC

BACKGROUND OF THE INVENTION

The present invention relates to a data recording control system, and more particularly to an optical information recording and apparatus in which data is recorded with the optimum intensity of a laser beam irradiated on an optical recording medium.

Generally, in a magneto-optical type optical disk apparatus or the like, data is recorded through heating by a laser beam. However, there is the case where if a constant laser power is used, a recording operation becomes insufficient due to the dirtiness of a lens of an optical head, a change in environmental temperature of an optical disk medium, the variation of sensitivity of the optical disk medium or the like.

For example, in a magneto-optical disk apparatus, as the surface temperature of a magneto-optical disk recording medium raises due to a change thereof, a magnetic domain as recorded has a tendency to be enlarged. Therefore, it is necessary to reduce the power of a writing laser beam so that the magnetic domain is not enlarged. To the contrary, when the surface temperature of the medium is low, a magnetic domain as recorded has a tendency to be narrowed. Therefore, it is necessary to increase the power of the writing laser beam. Also, in the case where dust is deposited on an objective lens of an optical head or the disk surface, the laser power must be increased since it is hard for the laser power to reach the disk surface so that a magnetic domain is narrowed or not formed with the result that an error is liable to generate. A similar problem is also provided in a write-once type optical disk apparatus. Namely, when the temperature becomes high, excess heating takes place so that a pit is enlarged. Conversely, when the temperature becomes low, a pit is narrowed or not formed.

However, even if the change in temperature is encountered, it is difficult to measure the temperature of the medium surface directly. Then, there may be considered a method in which a temperature sensor is provided in the apparatus to control the power of a writing laser beam in accordance with a detected temperature. But, when a magneto-optical disk is newly mounted, a proper laser power control corresponding to a change in temperature of the magneto-optical disk is not possible since the temperature in the apparatus and the surface temperature of the magneto-optical disk are different from each other.

Thus, as shown in JP-A-4-67436, there is proposed a method in which the pre-write testing is performed on a predetermined area on an optical disk prior to data recording and a laser driving current intensity to optimize the power of a laser beam at the time of data recording is set on the basis of the result from reproducing of pre-write testing data.

In order to set the laser driving current at the time of data recording, a reproduced signal from pre-write testing data is required. Therefore, the pre-write testing necessitates both a recording operation and a reproducing operation. In the case where an optical head is of a one-beam type, the reproducing operation corresponds to a rotation subsequent to the recording operation. Accordingly, a time for processing of a write command is increased by a time length corresponding to at least one rotation. Further, in the case where an area for pre-write testing is allotted to an area on an optical disk apart from a user area, the increase of the processing time becomes large due to the movement of the optical head, the positioning thereof, and so forth. In the case where an optical head is of a two-beam type, the increase of the processing time caused by the pre-write testing is to the extent of one revolution of the optical disk, if a pre-write testing area is within a user sector. However, if the pre-write testing area is outside the user sector, an increase of the write command processing time is considerable.

SUMMARY OF THE INVENTION

An object of the present invention is to provide an optical information recording method and apparatus in which the pre-write testing can be performed without increasing a processing time for a write command from a host and the recording can be performed always under the optimum recording condition even if the number of times of pre-write testing execution is reduced.

According to one aspect of the present invention, there is provided an optical information recording method of performing the pre-write testing of test data for an optical recording medium connected to a host, comprising the steps of: receiving an instruction for pre-write testing of test data inclusive of two predetermined continuous signals from an instruction device independently from a data write command from the host; supplying different laser driving currents for plural ones of pre-write testing areas of the optical recording medium to an optical information recording head in accordance with the pre-write testing instruction to perform the pre-write testing of the test data; reproducing the respective pre-write testing data to determine a difference in an average voltage level between the two continuous signals of each test data; setting the laser driving current supplied for the pre-write testing of the test data indicative of the smallest value of the difference, as a laser driving current which is to be supplied to the optical information recording head when the recording of user data is to be performed; and setting a time interval until the next pre-write testing of test data in accordance with the set laser driving current.

According to another aspect of the present invention, there is provided an optical information recording method of writing data into an optical recording medium connected to a host, comprising the steps of: receiving a data write command from the host; writing data into user data areas of data areas of the optical recording medium by an optical information recording head in accordance with the write command; determining, if there is inferiority in data writing, the pre-write testing of test data inclusive of two continuous signals in accordance with the number of times of inferiority in data writing; supplying different laser driving currents for plural ones of pre-write testing areas in the data areas of the optical recording medium to the optical information recording head to perform the pre-write testing of the test data; reproducing the respective pre-write testing data to determine a difference in an average voltage level between the two continuous signals of each test data; setting the laser driving current supplied for the pre-write testing of the test data indicative of the smallest value of the difference, as a laser driving current which is to be supplied to the optical information recording head when the recording of user data is to be performed; performing the positioning of the optical information recording head for the user data area to write the data again by the laser driving current; and writing the data into an alternate data area by the laser driving current if there is a defective block in data writing and completing the writing of the data into the user data area if there is no defective block in data writing.

According to a further aspect of the present invention, there is provided an optical information recording apparatus for performing the pre-write testing of test data for an optical recording medium connected to a host, comprising: an optical information recording control device for receiving at least a command for writing of data from the host; and an optical information recording medium controlled by the optical information recording control device in accordance with the command for writing of data so that the data is stored into the optical information recording medium, wherein the optical information recording control device includes first means for issuing an instruction for pre-write testing of test data inclusive of two predetermined continuous signals independently from a data write command from the host device; second means for indicating the pre-write testing of said test data by supplying different laser driving currents for plural ones of pre-write testing areas of the optical recording medium to an optical information recording head in accordance with the pre-write testing instruction an instruction, third means for reproducing the respective pre-write testing data to determine a difference in an average voltage level between the two continuous signals of each test data; fourth means for indicating the supply of the laser driving current supplied for the pre-write testing of the test data indicative of the smallest value of the difference when the recording of user data is to be performed; and fifth means for setting a time interval until the next pre-write testing of test data in accordance with the supplied laser driving current.

With the above construction of the present invention, when the optical recording medium is first mounted onto the optical disk drive or when a command from the host is not executed, the pre-write testing is performed for pre-write testing areas on the optical recording medium at a predetermined time interval independently from a write command from the host, so that a laser driving current at the time of recording of user data is set to the optimum value on the basis of a reproduced signal. In the case where there is a write command from the host, user data is written into the optical recording medium by the optimum laser driving current which has already been set. Accordingly, there is eliminated a need of performing the pre-write testing each time a write command is issued from the host. Also, the pre-write testing gives no influence on a processing of the host, thereby making it possible to prevent the increase of a processing time for recording of user data.

Also, when the laser driving current is set by the pre-write testing, a time interval is set until the next pre-write testing of the test date is executed, in accordance with a difference between the laser driving current set at the time of the previous pre-write testing and the laser driving current set at the time of the present pre-write testing. Thereby, when the difference in laser driving current is small, the time interval until the next pre-write testing is elongated. When the difference is large, the time interval until the next pre-write testing is shortened. Accordingly, immediately after the optical recording medium is mounted onto the optical disk drive, a pre-write testing time interval is determined to be short since a change in temperature of the optical recording medium is large and hence the set value of a laser driving current is changed for each pre-write testing. With the lapse of a time from the mounting, the change in temperature of the optical recording medium becomes small and hence the change of the set value of a laser driving current becomes small so that the pre-write testing time becomes long. Therefore, the reduced number of times of pre-write testing suffices.

Further, when the number of blocks defective in recording detected for a write command from the host is not smaller than a predetermined value, it may be presumed that an unexpected change in environmental temperature of the optical recording medium exists between pre-write tests. Even in such a case, however, it becomes possible to provide the optimum laser driving current.

BRIEF DESCRIPTION OF THE DRAWINGS

Figs. 1B to 1D show waveforms showing examples of reproduced test data;

FIG. 2 is a flow chart for explaining another optical information recording method of the present invention;

FIG. 3 is a block diagram showing a general magneto-optical information recording apparatus;

DESCRIPTION OF THE PREFERRED EMBODIMENTS

An embodiment of the present invention will now be explained by use of the accompanying drawings.

First, the outline of the present invention will be explained on the basis of FIGS. 3 to 5.

FIG. 3 shows an example of the construction of a magneto-optical disk apparatus used in an embodiment in the case where the present invention is applied to the magneto-optical disk apparatus. A magneto-optical disk drive 3 has a magneto-optical disk medium 4 mounted thereon or inserted therein and performs operations including the writing, reading and erasure of data for the magneto-optical disk medium 4. A CPU (central processing unit) 1 is a host computer for the magneto-optical disk apparatus. A magneto-optical disk controller 2 receives a command from the CPU 1 to control the magneto-optical disk drive 3.

Figure 4:
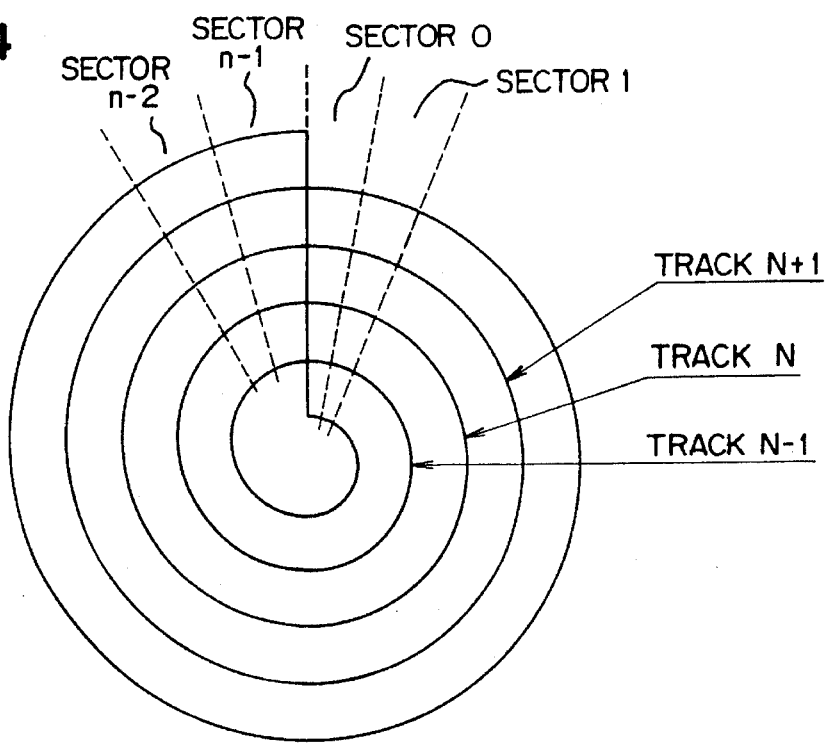
FIG. 4 is a diagram for explaining a general magneto-optical information recording medium.

FIG. 4 shows an example of the format of tracks on the magneto-optical disk medium 4. In the shown example, tracks having a spiral form as a whole are provided. However, there may be the case where the tracks are concentrically formed. Each track is divided into a plurality of sectors which have inherent addresses, respectively. In FIG. 4, the number of sectors in each track is the same on the inner circumference and the outer circumference. However, there may be employed a track format in which the number of sectors in one track is increased as the track goes to the outer circumference.

Figure 5:
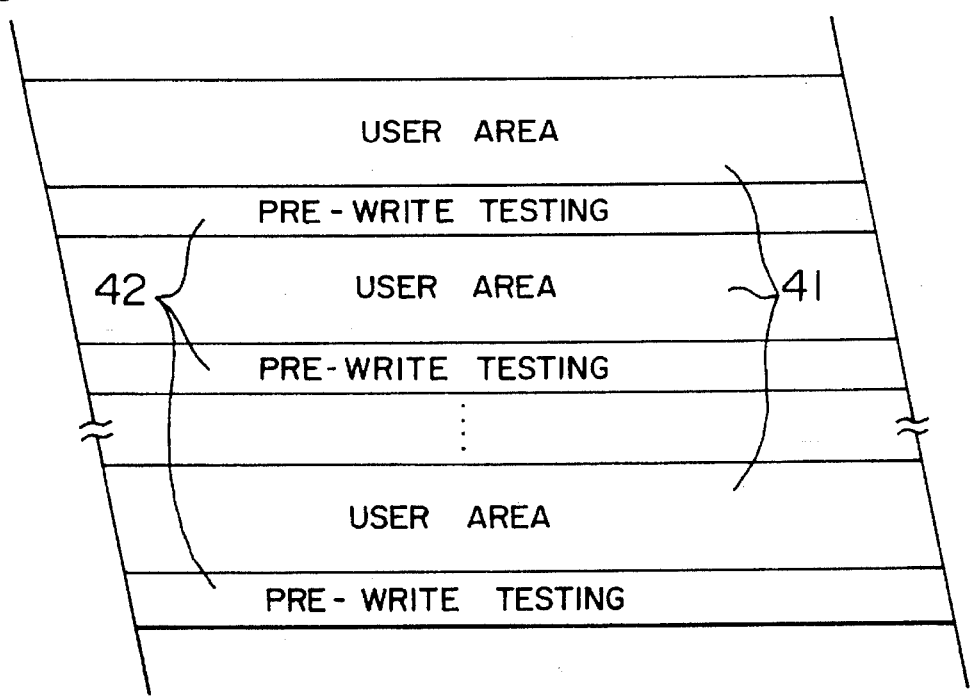
FIG. 5 is an enlarged view showing user areas and pre-write testing areas on tracks of the magneto-optical information recording medium.

FIG. 5 shows a data area on the magneto-optical disk medium 4 for each track. The data area is composed of a user area 41 and a pre-write testing area 42 which are partitioned for each sector, as shown in FIG. 4. It is noted that the user area 41 includes optical blocks allocated to recording defective blocks. The pre-write testing area 42 and the user area 41 form plural tracks in a pair. The pre-write testing areas 42 to be actually used for pre-write testing may be determined so that they are odd-numbered pre-write testing areas when the numbering is made starting from the center of the magneto-optical disk medium 4, even-numbered pre-write testing areas, every fifth pre-write testing area, or pre-write testing areas of the inner and outer circumferential tracks. Further, the pre-write testing areas 42 to be actually used for pre-write testing can be determined so that they are the pre-write testing areas of odd-numbered sectors of the above-defined track, the pre-write testing areas of even-numbered sectors or the pre-write testing areas of every fifth sector. Thus, the pre-write testing areas 42 to be actually used for pre-write testing can be determined arbitrarily.

Figure 6:
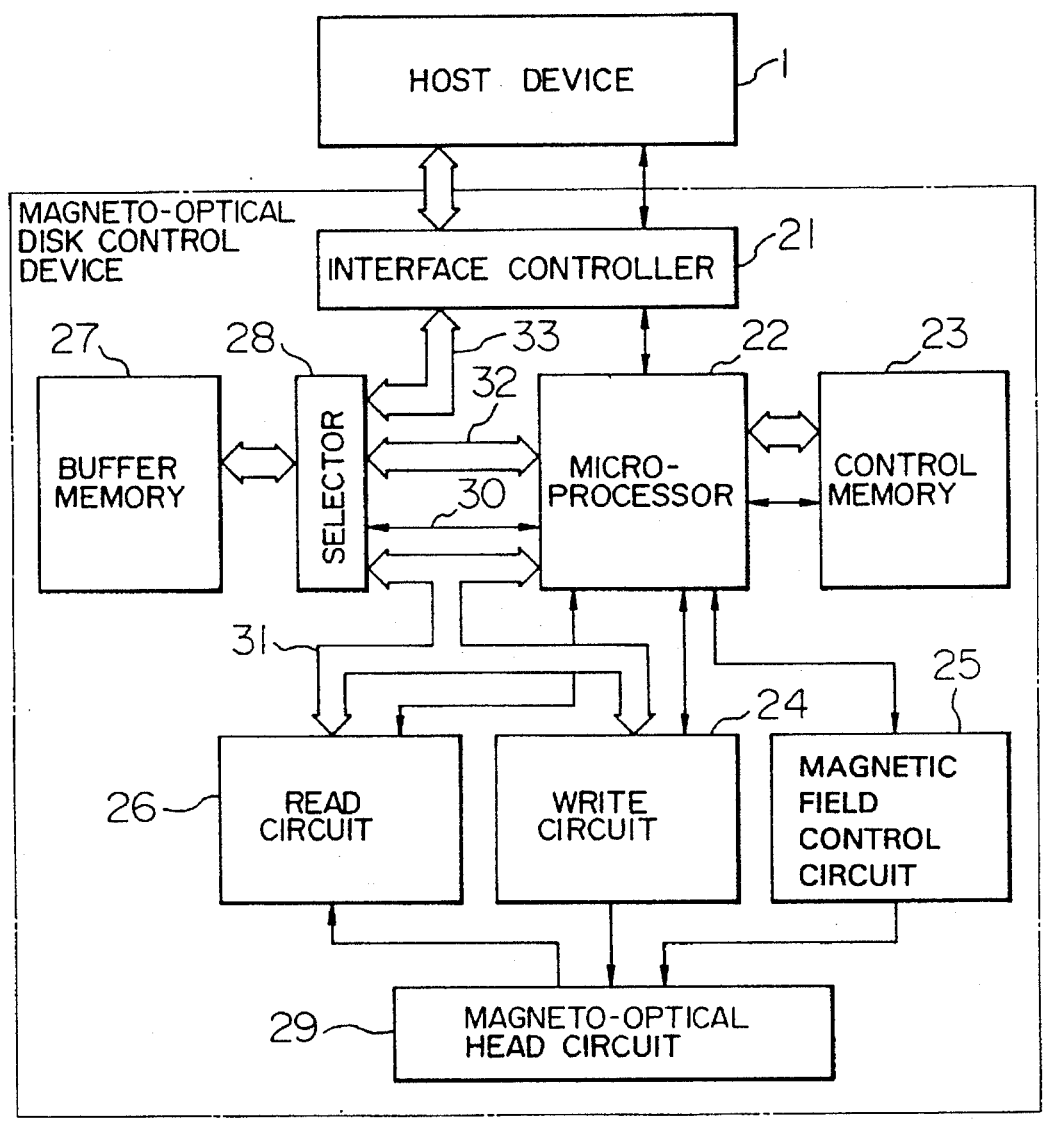
FIG. 6 is a block diagram showing a magneto-optical recording control device for performing the optical information recording method of the present invention.

A constituent element of the above-mentioned magneto-optical disk apparatus relevant to the present invention is the magneto-optical disk controller 2. The details of the magneto-optical disk controller 2 are shown in FIG. 6. In the figure, reference numeral 21 denotes an interface controller for controlling a signal communication with the host computer 1, numeral 22 a microprocessor for performing an operation corresponding to a command from the host computer 1 and a pre-write testing operation in a predetermined procedure, numeral 23 a memory for storing therein a microcode which defines a control operation by the microprocessor 22, numeral 24 a write circuit for modulating information read from a buffer memory 27 to output the modulated information to a magneto-optical head circuit 29, numeral 25 a magnetic field control circuit for recording and erasing information on a magneto-optical disk, and numeral 26 a read circuit for demodulating an output signal from the magneto-optical head circuit 29 to store the demodulated signal into the buffer memory 27. Numeral 28 denotes a selector for selecting input/output buses of the buffer memory 27. The selector 28 selectively connects an interface bus 33, a processor bus 32 or a read/write circuit bus 31 to the buffer memory 27 in accordance with a microcode 30 given from the microprocessor 22.

Figure 1A:
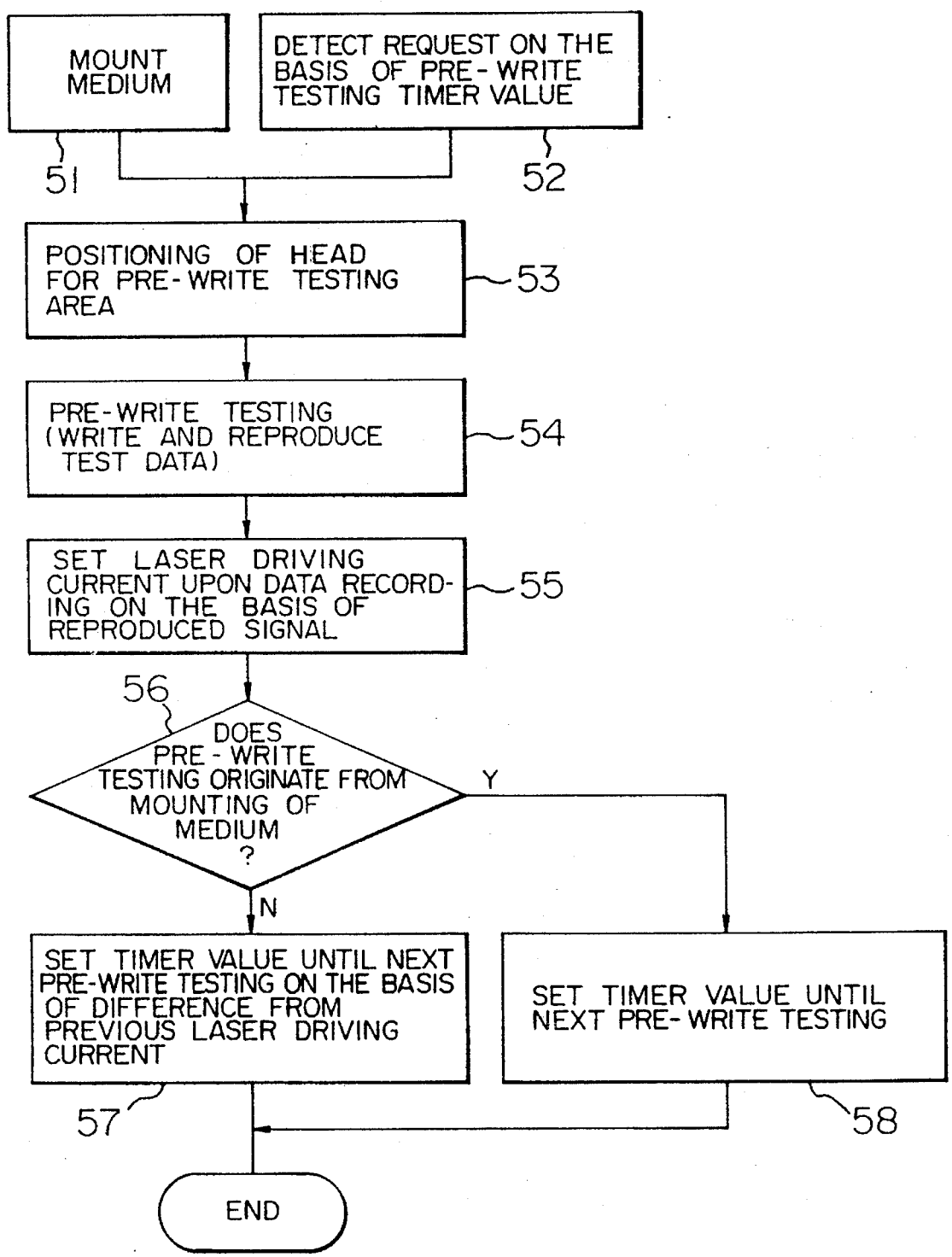
FIG. 1A is a flow chart for explaining an optical information recording method of the present invention.

An operation for pre-write testing of test data into the magneto-optical disk medium 4 by the magneto-optical disk apparatus having the above construction will be explained along a flow chart shown in FIG. 1A. In the present embodiment, the pre-write testing of test data is made for ones of the predetermined pre-write testing areas 42 for every other sector.

First, explanation will be made of a pre-write testing operation when the magneto-optical disk medium 4 is mounted onto or inserted into the magneto-optical disk drive 3. First, the magneto-optical disk medium 4 is mounted onto the magneto-optical disk drive 3. In step 51, the judgement is made of whether or not the magneto-optical disk medium 4 is mounted. In step 53, the positioning of a magneto-optical head for the predetermined pre-write testing area 42 as mentioned above is performed. In step 54, test data is written into the pre-write testing area 42 and the written test data is reproduced.

Figure 1E:
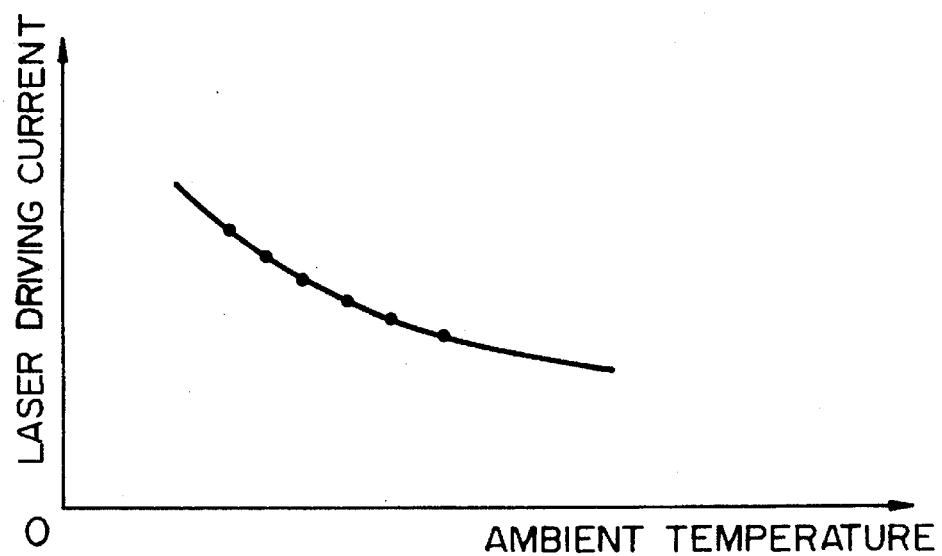
FIG. 1E is a graph showing a predetermined characteristic curve for determining the value of a laser driving current for an ambient temperature.

The test data includes a waveform which has a small amplitude and a high frequency and a waveform which has a large amplitude and a low frequency, as shown in FIGS. 1B to 1D. The pre-write testing of such test data into the pre-write testing area 42 is performed for every other sector by such laser driving currents $i_1, i_2, - - - i_n$ for ambient temperatures as represented by a characteristic curve which is shown in FIG. 1E. The laser driving currents $i_1, i_2, - - - i_n$ are stored beforehand in the control memory 23 at a relationship defined in accordance with the characteristic curve shown in FIG. 1E. Thus, the pre-write testing of test data is performed in such a manner that the magneto-optical head is driven by the laser driving current $i_1, i_2, - - - i_n$ determined in accordance with an ambient temperature when the magneto-optical disk medium 4 is mounted onto the magneto-optical disk drive 3. Laser driving currents for the writing of test data are supplied in the order of current values starting from a current value corresponding to a relatively high temperature in the characteristic curve shown in FIG. 1E. Namely, the driving currents are supplied in an order from a low value toward a high value. When the test data is written, the erasure of test data having been recorded in a pre-write testing area 42 to be subjected to pre-write testing is made, as required. In this case, the magneto-optical disk medium 4 is rotated two times for erasure and writing. However, the erasure of test data having been recorded may be made later than the pre-write testing of test data.

Figure 1F:
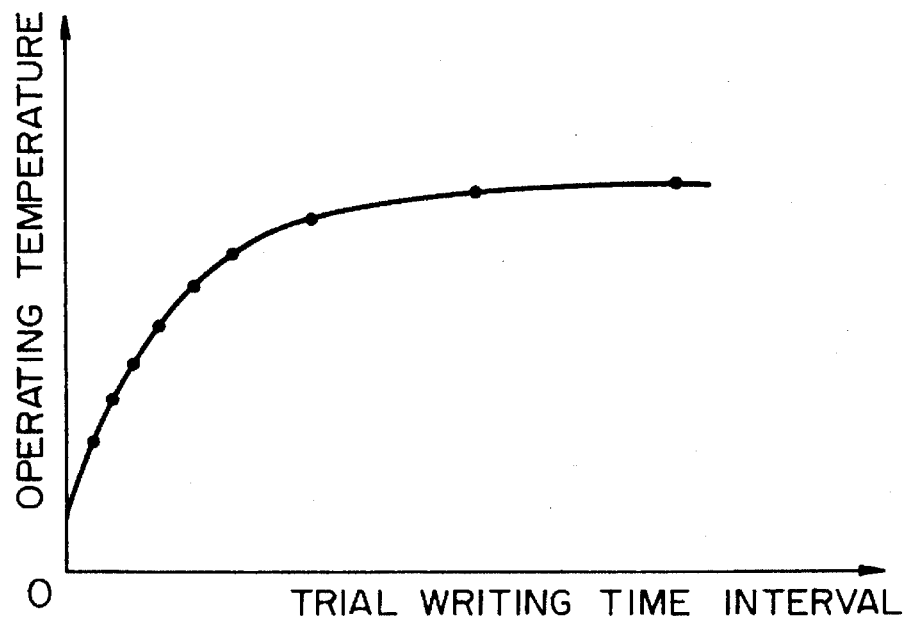
FIG. 1F is a graph showing a predetermined characteristic curve for determining a pre-write testing time interval for the operating temperature of a magneto-optical recording medium.

In step 55, the next laser driving current is determined in accordance with the reproduced test data. Namely, as shown in FIGS. 1B to 1D, there exists a difference $\Delta v$ between the average level of the waveform of the reproduced test data which has a small amplitude and a high frequency and the average level of the waveform thereof which has a large amplitude and a low frequency. For example, since the difference $\Delta v$ for the reproduced test data of FIG. 1C among such reproduced test data of FIGS. 1B to 1D is the smallest, a laser driving current having supplied this test data to a predetermined sector, that is, a laser driving current $i_2$ is determined or set as a laser driving current to be next supplied. The determined laser driving current $i_2$ is stored once into the control memory 23. In step 56, the judgement is made of whether or not the pre-write testing originates from the mounting of the magneto-optical disk medium 4 onto the magneto-optical disk drive 3. In the case where the pre-write testing originates from the mounting of the magneto-optical disk medium 4 onto the magneto-optical disk drive 3, a timer value until the next pre-write testing of test data is set in step 58. This timer value is set in such a manner that a relationship between an operating temperature and a pre-write testing time as shown in FIG. 1F is stored in the control memory 23 beforehand and a time for the next pre-write testing for the operating temperature is determined from the stored relationship. The setting of the timer value is made in a region in which a change in temperature for a change in time is large in the characteristic curve shown in FIG. 1F, that is, the change in the time is sufficiently small. The above control is performed by the microprocessor 22 of the magneto-optical disk controller 2 shown in FIG. 6.

In the case where a laser driving current for the inner circumference of the magneto-optical disk 4 and that for the outer circumference thereof are different from each other in a processing in which the positioning of the magneto-optical head for the pre-write testing area 42 is performed (step 53) and the pre-write testing is performed (step 54) and the laser driving current is set (step 55),(for example, in the case where the higher peripheral speed of the medium and a shorter time for passage of one sector are required with the progression to the outer circumference; that is, in the case where it is necessary to make the laser driving current high with the progression to the outer circumference), the pre-write testing is performed for a plurality of trial write areas provided on the magneto-optical disk medium 4 so that laser driving currents at the time of user data recording for the respective areas are stored. And, when the user data recording is to be made, the recording is carried out by determining laser driving currents corresponding to areas to be subjected to recording. If a difference in laser driving current between areas on the magneto-optical disk medium 4 is substantially constant over a region from the inner circumference to the outer circumference, there can be employed a method in which the pre-write testing is performed for only the pre-write testing areas 42 of the innermost and outermost circumferences and laser driving currents for the other areas are set on the basis of the laser driving currents for the innermost and outermost circumferences.

Next, explanation will be made of the pre-write testing of test data into the pre-write testing area 42 in a normal condition, that is, when user data is to be written into the user area 41 in a state in which the magneto-optical disk medium 4 has already been mounted on the magneto-optical disk drive 3.

First or in step 52, the judgement as to the pre-write testing of test data is made on the basis of the timer value set in step 58. In step 53, the positioning of a magneto-optical head for the predetermined pre-write testing area 42 is performed. In step 54, the pre-write testing of test data into the pre-write testing area 42 is performed and the written test data is reproduced. The writing and reproduction have already been explained in conjunction with FIG. 1E. In step 55, a laser driving current is determined in accordance with the reproduced test data. This determination of the laser driving current has already been explained. In step 56, the judgement is made of whether or not the pre-write testing originates from the mounting of the magneto-optical disk medium 4 onto the magneto-optical disk drive 3. Since the case is not so, the flow turns to step 57 in which a difference ΔP between the previous (or preceding) and present set values of the laser driving current is determined and a time interval or timer value until the next pre-write testing is determined in accordance with the determined difference. This determination of the timer value is made in such a manner that a relationship between the difference ΔP in laser driving current and the timer value corresponding to the difference is stored beforehand in the control memory 23.

The timer value until the next pre-write testing is set such that it is made large and small as the difference ΔP in laser driving current becomes small and large, respectively. For example, the timer value is set such that the time is Tmax if the difference ΔP in laser driving current is 0, Tmin immediately after the insertion or mounting of the magneto-optical disk medium 4, and Tmin +A(constant)/|ΔP| in the other case.

For the pre-write testing in this case, too, when the laser driving current differs depending upon an area of the magneto-optical disk medium 4, the pre-write testing is performed for a plurality of pre-write testing areas 42 so that laser driving currents for the respective areas are stored. Also, if the variation of the set value of a laser driving current for one pre-write testing area can be used to set laser driving currents for the other pre-write testing areas, the pre-write testing for only one pre-write testing area suffices. In such a case, the pre-write testing may be performed for a pre-write testing area 42 nearest to a track on which the magneto-optical head is positioned at the time of generation of a request for the pre-write testing.

Since the pre-write processing based on the pre-write testing timer at the normal condition is performed independently from a command from the CPU 1, there may be the case where the command from the CPU 1 is received in the course of the pre-write processing. In this case, there can be used a method in which the pre-write testing is stopped to execute the command from the CPU 1 and is performed again after the completion of execution of the command. Alternatively, the command from the CPU 1 may be executed after the completion of the pre-write processing. There can also be employed a method in which only in the case where the command from the CPU 1 is a write processing, the command from the CPU 1 is executed after the completion of the pre-write processing, whereas in the case where the command from the CPU 1 is a command other than the write processing, the pre-write testing is stopped to execute the command from the CPU 1 and is performed again after the completion of execution of the command.

Next, a writing operation will be explained in detail by use of a flow chart shown in FIG. 2.

When receiving a write command from the CPU 1, the magneto-optical disk controller 2 performs the positioning of the magneto-optical head (step 61). Thereafter, data to be written is received and a check for writing and reading of the data is made (step 62). In step 63, the judgement is made of whether or not there is a block which is defective in recording. If there is no block which is defective in recording, the processing is completed. If there is a block which is inferior in recording, the judgement is made of whether or not a pre-write processing is to be performed or whether or not the number of defective blocks is not smaller than a predetermined number (step 64). In the case where it is determined that the pre-write processing is not necessary, a processing for allotment of an alternative block for the defective block is performed (step 70), thereby completing the process.

In the case where it is determined in step 64 that the pre-write processing is necessary, the positioning of the head for a pre-write testing area is performed (step 65). Next, the pre-write processing is performed and a laser driving current is thereafter set (step 66). Then, the positioning of the magneto-optical head for the defective block is performed again (step 67) and a check for writing and reading of data for the defective block is made again (step 68). Thereafter, the judgement is made of whether or not there is a block which is defective in recording (step 69). If there is no defective block, the processing is completed. If there is an inferior block, a processing for allocation of a defective block for the defective block is performed (step 70), thereby completing the process. Step 66 corresponds to steps 53 to 57 explained in conjunction with FIG. 1.

According to the present embodiment, the pre-write testing is performed independently from a write command from a host computer and a laser driving current at the time of recording of user data is set to the optimum value each the pre-write testing is performed. Therefore, it is not necessary to perform the pre-write testing for each write command from the host computer. Thereby, it is possible to prevent the increase of a processing time for recording of user data. This effect becomes remarkable in the case where a pre-write testing area is provided separately from a user area and in the case where a magneto-optical head is of a one-beam type.

Also, a time interval for pre-write testing execution is determined from a difference in set value of a laser driving current based on the pre-write testing execution. Therefore, in a normal condition in which there is almost no change in environmental temperature of a magneto-optical disk medium, the time interval for pre-write testing execution is elongated and the number of times of pre-write testing execution is reduced. Thereby, the frequency of collision with a command from the host computer can be reduced and the lifetime of a pre-write testing area can be elongated.

Further, a plurality of pre-write testing areas are provided on a magneto-optical disk medium. Therefore, in the case where laser driving currents over the whole surface of the magneto-optical disk medium can be determined on the basis of the result of pre-write testing for one trial write area, there suffices the pre-write testing for the nearest pre-write testing area where a magneto-optical head is positioned. Thereby, a positioning time for pre-write testing can be shortened.

Furthermore, the pre-write testing is performed when a defective block in recording is detected for a write command from the host computer. Therefore, even if a rapid change in environmental temperature of the magneto-optical disk medium exists between pre-write testings so that the previous laser driving current value deviates from the optimum laser driving current value, the laser driving current can be set again to the optimum value to perform the pre-write testing again. Thereby, it is possible to reduce the number of alternative blocks to be allocated for blocks which result defective recording at the time of writing.

The present invention can be applied to an optical information recording and reproducing apparatus such as a magneto-optical disk apparatus, a write-once type optical disk apparatus and so forth.

What is claimed is:

1. An optical information recording method of performing the pre-write testing of test-data for an optical recording medium connected to a host, comprising:
   (a) receiving an instruction for pre-write testing of test data inclusive of two predetermined continuous signals from instruction means independently from a write command from said host;
   (b) supplying different laser driving currents for plural ones of pre-write testing areas of said optical recording medium to an optical information recording head in accordance with said pre-write testing instruction to perform the pre-write testing of said test data;
   (c) reproducing the respective pre-write data to determine a difference in a voltage level between the two continuous signals of each test data;
   (d) setting the laser driving current supplied for the pre-write testing of the test data indicative of the smallest value of said difference, as a laser driving current which is to be supplied to said optical information recording head when the recording of user data is to be performed; and
   (e) setting a time interval until the next pre-write testing of test data is executed in accordance with a difference between the laser driving current set at the time of the previous pre-write testing and the laser driving current set at the time of the present pre-write testing.

2. An optical information recording method according to claim 1, wherein said step (e) includes determining the difference between the value of the laser driving current supplied at the time of the previous pre-write testing and the value of the laser driving current supplied at the time of the present pre-write testing, and determining said time interval from a relation indicated on a constant table of the time interval with respect to said difference so that the time interval until the next pre-write testing of test data becomes longer as said difference becomes smaller.

3. An optical information recording method according to claim 1, wherein in said step (e), said time interval is determined from a relation indicated on a constant table of the time interval with respect to an operating temperature at the time of the present pre-write testing.

4. An optical information recording method according to claim 1, wherein said pre-write testing instruction received in said step (a) is issued by an optical disk drive when said optical recording medium is mounted onto said optical disk drive or is issued in accordance with the time interval until the next pre-write testing of test data set in said step (e).

5. An optical information recording method according to claim 1, wherein said step (b) includes supplying the different laser driving currents for a plurality of sectors of pre-write testing areas of a plurality of tracks of said optical recording medium to said optical information recording head in accordance with said trial write command to perform the pre-write testing of said test data.

6. An optical information recording method according to claim 5, wherein said step (b) includes supplying the different laser driving currents for a plurality of sectors of pre-write testing areas of the innermost and outermost circumferential tracks of said optical recording medium to said optical information recording head to perform the pre-write testing of said test data.

7. An optical information recording method according to claim 6, wherein said step (b) includes supplying different laser driving currents for every other sector of pre-write testing areas of the plurality of tracks of said optical recording medium to said optical information recording head to perform the pre-write testing of said test data.

8. An optical information recording method according to claim 1, wherein the test data pre-write testing in said step (b) includes continuous signals composed of a signal which includes a waveform having a small amplitude and a high frequency and a signal which includes a waveform having a large amplitude and a low frequency.

9. An optical information recording method according to claim 1, wherein said step (c) includes reproducing the respective pre-write testing data to determine a difference in the average voltage level between the two signals of each test data composed of a signal which includes a waveform having a high frequency and a signal which includes a waveform having a low frequency.

10. An optical information recording method according to claim 1, wherein in said step (d), the laser driving current supplied for the pre-write testing of the test data indicative of the smallest value of said difference in the average voltage level between the two signals of each test data composed of a signal including a waveform having a high frequency and a signal including a waveform having a low frequency is set as the laser driving current when the recording of user data is to be performed.

11. An optical information recording method of writing data into an optical recording medium connected to a host device, comprising:
   (a) receiving data write command from said host device;
   (b) wring data into user data areas of data areas of said optical recording medium by an optical information recording head in accordance with said write command;
   (c) determining, if there is a defective block in data writing, the pre-write testing of test data inclusive of two continuous signals in accordance with the number of occurrences of a defective block in data writing;
   (d) supplying different laser driving currents for plural ones of pre-write testing areas in said data areas of said optical recording medium to said optical information recording head to perform the pre-write testing of said test data;

(e) reproducing the respective pre-write testing data to determine a difference in an average voltage level between the two continuous signals of each test data;

(f) setting the laser driving current supplied for the pre-write testing of the test data indicative of the smallest value of said difference, as a laser driving current which is to be supplied to said optical information recording head when the recording of user data is to be performed;

(g) performing the positioning of said optical information recording head for said user data area to write said data again by said laser driving current;

(h) writing said data into another user data area by said laser driving current if there is a defective block in data writing and completing the writing of said data into an optional block of said user area if there is no defective block in data writing; and (i) setting a time interval until the next pre-write testing of test data is executed in accordance with a difference between the laser driving current set at the time of the previous pre-write testing and the laser driving current set at the time of the present pre-write testing.

12. An optical information recording apparatus for performing the pre-write testing of test data for an optical recording medium connected to a host device, comprising:

an optical information recording control device for receiving at least a command for writing of data from said host device, and an optical information recording medium controlled by said optical information recording controller in accordance with said command for writing of data so that said data is stored into said optical information recording medium, wherein said optical information recording controller includes:

first means for issuing an instruction for pre-write testing of test data inclusive of two predetermined continuous signals independently from a write command from said host device;

first means for indicating the pre-write testing of said test data by supplying different laser driving currents for plural ones of pre-write testing areas of said optical recording medium to an optical information recording head in accordance with said pre-write testing instruction;

third means for reproducing the respective pre-write test data to determine a difference in an average voltage level between the two continuous signals of each test data;

fourth means for indicating the supply of the laser driving current supplied for the pre-write testing of the test data indicative of the smallest value of said difference when the recording of user data is to be performed; and fifth means for setting a time interval until the next pre-write testing of test data is executed in accordance with a difference between the laser driving current set at the time of the previous pre-write testing and the laser driving current set at the time of the present pre-write testing.

13. An optical information recording apparatus according to claim 12, wherein said fifth means determines the difference between the value of the laser driving current supplied at the time of the previous pre-write testing and the value of the laser driving current supplied at the time of the present pre-write testing, and determines said time interval from a relation indicated on a constant table of the time interval with respect to said difference so that the time interval until the next pre-write testing of the test data becomes longer as said difference becomes smaller.

14. An optical information recording apparatus according to claim 12, wherein said fifth means determines said time interval from a relation indicated on a constant table of the time interval with respect to an operating temperature at the time of the present pre-write testing.

15. An optical information recording apparatus according to claim 12, wherein said first means issues said pre-write testing instruction when said optical recording medium is mounted onto said optical disk drive or when the time interval until the next pre-write testing of test data set by said fifth means is elapsed.

16. An optical information recording apparatus according to claim 12, wherein said second means indicates the pre-write testing of said test data by supplying the different laser driving currents for a plurality of sectors of pre-write testing areas of a plurality of tracks of said optical recording medium to said optical information recording head in accordance with said pre-write testing instruction.

17. An optical information recording apparatus according to claim 16, wherein said second means indicates the pre-write testing of said test data by supplying the different laser driving currents for a plurality of sectors of pre-write testing areas of the innermost and outermost circumferential tracks of said optical recording medium to said optical information recording head.

18. An optical information recording apparatus according to claim 17, wherein said second means indicates the pre-write testing of said test data by supplying different laser driving currents for every other sector of pre-write testing areas of the plurality of tracks of said optical recording medium to said optical information recording head.

19. An optical information recording apparatus according to claim 12, wherein said third means determines a difference in the average voltage level between a waveform of each reproduced test data which has a small amplitude and a high frequency and a wave form thereof which has a large amplitude and a low frequency.

20. An optical information recording apparatus according to claim 12, wherein said fourth means sets the laser driving current supplied for the pre-write testing of the test data indicative of the smallest value of said difference in the average voltage level between a waveform of each test data having a high frequency and a waveform thereof having a low frequency, as a laser driving current when the recording of user data is to be performed.

\* \* \* \* \*